United States Patent
Feng et al.

(10) Patent No.: US 10,847,970 B2
(45) Date of Patent: Nov. 24, 2020

(54) SYSTEM FOR AND METHOD OF CONTROLLING INRUSH CURRENT BETWEEN A POWER SOURCE AND A LOAD

(71) Applicant: HAMILTON SUNDSTRAND CORPORATION, Charlotte, NC (US)

(72) Inventors: Frank Z. Feng, Loves Park, IL (US); Randall Bax, Rockton, IL (US); Ryan W. Schmid, Rockford, IL (US); Huazhen (Harry) Chai, Caledonia, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 445 days.

(21) Appl. No.: 15/875,839

(22) Filed: Jan. 19, 2018

(65) Prior Publication Data
US 2019/0229524 A1    Jul. 25, 2019

(51) Int. Cl.
*H02H 9/00* (2006.01)
*H02H 1/00* (2006.01)
(Continued)

(52) U.S. Cl.
CPC .......... *H02H 9/001* (2013.01); *H02H 1/0007* (2013.01); *H02H 1/043* (2013.01); *H02M 3/155* (2013.01)

(58) Field of Classification Search
CPC ........ H02H 1/043; H02H 9/001; H02H 9/025; H02H 9/005; H02H 7/16; H02M 3/04–07; H02M 3/10; H02M 3/155; H02M 3/156
See application file for complete search history.

(56) References Cited

U.S. PATENT DOCUMENTS 5,303,114 A * 4/1994 Ferry ...................... H02H 3/087
                                                                323/908
5,793,589 A * 8/1998 Friedl ..................... H02H 3/445
                                                                307/131
(Continued)

FOREIGN PATENT DOCUMENTS

JP    2005045957    2/2005
WO    9201335      1/1992
(Continued)

OTHER PUBLICATIONS

European Patent Office, European Search Report dated Jun. 21, 2019 in Application No. 19152643.3.

*Primary Examiner* — Jared Fureman
*Assistant Examiner* — Christopher J Clark
(74) *Attorney, Agent, or Firm* — Snell & Wilmer LLP

(57) ABSTRACT

A system for controlling inrush current between a power source and a load includes an output capacitor configured to be coupled in parallel with the load. The system also includes a transistor having a gate, a collector configured to be coupled to the power source, and an emitter configured to be coupled to the load. The system also includes a collector resistor coupled between the collector of the transistor and the gate of the transistor. The system also includes an emitter capacitor coupled between the gate of the transistor and the emitter of the transistor to facilitate current flow from the power source through the collector resistor and the emitter capacitor to charge the output capacitor.

20 Claims, 4 Drawing Sheets

(51) Int. Cl.
*H02H 1/04* (2006.01)
*H02M 3/155* (2006.01)

(56) References Cited

U.S. PATENT DOCUMENTS

| | | |
|---|---|---|
| 6,335,654 B1 | 1/2002 | Cole |
| 2015/0381047 A1* | 12/2015 | Chang .................. H02M 3/158 |
| | | 323/311 |
| 2018/0006447 A1* | 1/2018 | Morita .................. H01H 9/542 |

FOREIGN PATENT DOCUMENTS

| | | | |
|---|---|---|---|
| WO | 2016060541 | 4/2016 | |
| WO | WO-2016060541 A1 * | 4/2016 | ............. H02H 9/025 |

* cited by examiner

SYSTEM FOR AND METHOD OF CONTROLLING INRUSH CURRENT BETWEEN A POWER SOURCE AND A LOAD

FIELD

The present disclosure is directed to systems and methods for controlling inrush current between a power source and a load.

BACKGROUND

Inrush current may refer to a relatively large surge of current that occurs when a device (i.e., load) is initially powered on via a power source. It is desirable to reduce or control the inrush current, especially if the load includes sensitive electronics, the surge of current can damage sensitive parts. For example, it is desirable to reduce or control inrush current in aircraft systems due to the numerous sensitive electronic components utilized in such aircraft systems. Some systems utilize a resistor coupled between a collector and an emitter of a transistor to limit such inrush current. However, such resistors may be subject to overheating and damage, and may thus occasionally require replacement.

SUMMARY

Described herein is a system for controlling inrush current between a power source and a load. The system includes an output capacitor configured to be coupled in parallel with the load. The system also includes a transistor having a gate, a collector configured to be coupled to the power source, and an emitter configured to be coupled to the load. The system also includes a collector resistor coupled between the collector of the transistor and the gate of the transistor. The system also includes an emitter capacitor coupled between the gate of the transistor and the emitter of the transistor to facilitate current flow from the power source through the collector resistor and the emitter capacitor to charge the output capacitor.

Any of the foregoing embodiments may also include a diode coupled between the emitter of the transistor and the collector of the transistor.

In any of the foregoing embodiments, the diode may be biased to reduce a likelihood of current flowing through the diode from the collector to the emitter.

Any of the foregoing embodiments may also include a sensor configured to detect an output capacitor status corresponding to a charge level of the output capacitor.

Any of the foregoing embodiments may also include a controller coupled to the gate of the transistor and the sensor and configured to control the transistor based on the output capacitor status.

In any of the foregoing embodiments, the controller is further configured to determine a transistor on event in response to the output capacitor status indicating that the output capacitor is fully charged; and apply an on mode voltage to the gate of the transistor to cause the transistor to operate in an on mode to allow a driving current to pass through the transistor to power the load in response to determining the transistor on event.

In any of the foregoing embodiments, the controller is further configured to determine a transistor off event in response to determining that the power source has been turned off; and apply an off mode voltage to the gate of the transistor to cause the transistor to prevent the driving current from passing through the transistor.

Any of the foregoing embodiments may also include a gate resistor coupled between the controller and the gate of the transistor.

In any of the foregoing embodiments, the transistor is an insulated-gate bipolar transistor (IGBT).

In any of the foregoing embodiments, the transistor is a metal-oxide-semiconductor field-effect transistor (MOSFET) such that the collector of the transistor is a source of the MOSFET and the emitter of the transistor is a drain of the MOSFET.

Also disclosed is a system for controlling inrush current between a power source and a load. The system includes an output capacitor configured to be coupled in parallel with the load. The system also includes a transistor having a gate, a collector configured to be coupled to the power source, and an emitter configured to be coupled to the load. The system also includes a collector resistor coupled between the collector of the transistor and the gate of the transistor. The system also includes an emitter capacitor coupled between the gate of the transistor and the emitter of the transistor to facilitate current flow from the power source through the collector resistor and the emitter capacitor to charge the output capacitor. The system also includes a controller coupled to the gate of the transistor and configured to determine a transistor on event in response to determining that the output capacitor is fully charged, and apply an on mode voltage to the gate of the transistor to cause the transistor to operate in an on mode to allow a driving current to pass through the transistor to power the load in response to determining the transistor on event.

Any of the foregoing embodiments may also include a diode coupled between the emitter of the transistor and the collector of the transistor and biased to reduce a likelihood of current flowing through the diode from the collector to the emitter.

Any of the foregoing embodiments may also include a sensor coupled to the controller and configured to detect an output capacitor status corresponding to a charge level of the output capacitor.

In any of the foregoing embodiments, the controller is further configured to determine the transistor on event in response to the output capacitor status indicating that the output capacitor is fully charged.

In any of the foregoing embodiments, the controller is further configured to determine a transistor off event in response to determining that the power source has been turned off; and apply an off mode voltage to the gate of the transistor to cause the transistor to prevent the driving current from passing through the transistor.

In any of the foregoing embodiments, the transistor is an insulated-gate bipolar transistor (IGBT).

Also disclosed is a method for controlling inrush current between a power source and a load. The method includes outputting, by the power source, electrical current. The method further includes facilitating, by a collector resistor and an emitter capacitor of a circuit, flow of the electrical current through the collector resistor and the emitter capacitor to charge the output capacitor, the circuit being located between the power source and the load. The circuit includes an output capacitor configured to be coupled in parallel with the load, a transistor having a gate, a collector configured to be coupled to the power source, and an emitter configured to be coupled to the load, a collector resistor coupled between the collector of the transistor and the gate of the transistor, and an emitter capacitor coupled between the gate of the transistor and the emitter of the transistor. The method further includes determining, by a controller, a transistor on event in response to the output capacitor being fully charged. The method further includes applying, by the controller, an on mode voltage to the gate of the transistor to cause the transistor to operate in an on mode to allow a driving current to pass through the transistor to power the load in response to determining the transistor on event.

Any of the foregoing embodiments may also include detecting, by a sensor, an output capacitor status corresponding to a charge level of the output capacitor, wherein determining the transistor on event further includes determining the transistor on event in response to the output capacitor status indicating that the output capacitor is fully charged.

Any of the foregoing embodiments may also include determining, by the controller, a transistor off event in response to determining that the power source has been turned off; and applying, by the controller, an off mode voltage to the gate of the transistor to cause the transistor to prevent the driving current from passing through the transistor.

In any of the foregoing embodiments, at least one of: the transistor is an insulated-gate bipolar transistor (IGBT); or the transistor is a metal-oxide-semiconductor field-effect transistor (MOSFET) such that the collector of the transistor is a source of the MOSFET and the emitter of the transistor is a drain of the MOSFET.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
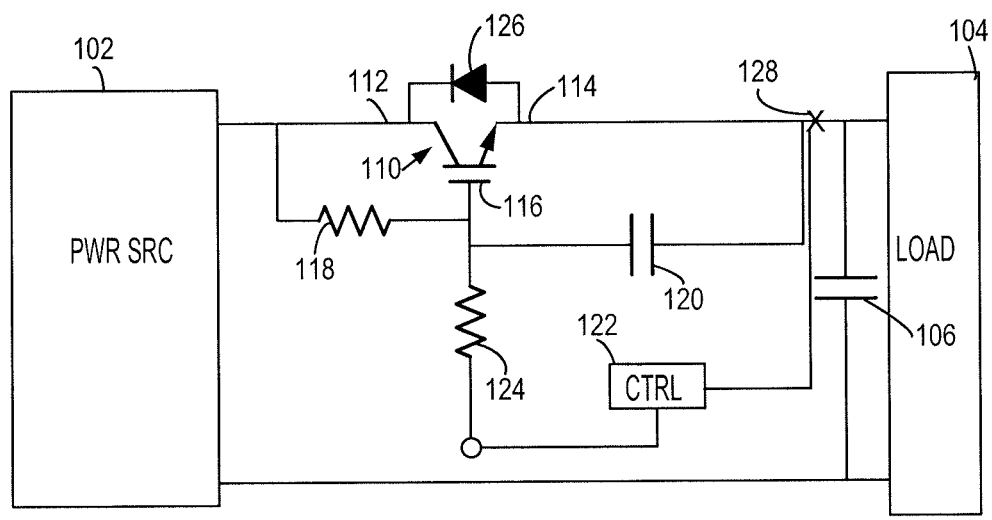
FIG. 1A is a schematic drawing illustrating a system for controlling inrush current between a power source and a load, in accordance with various embodiments of the present disclosure.

Referring to FIG. 1A, a system 100 for controlling inrush current is shown. The system 100 may be designed to limit inrush current between a power source 102 and a load 104. The system 100 may include an output capacitor 106, a transistor 110 having a collector 112, an emitter 114, and a gate 116, a collector resistor 118, an emitter capacitor 120, a controller 122, a gate resistor 124, a diode 126, and a sensor 128.

The output capacitor 106 may include any capacitor or other electronic component that functions as a capacitor. For example, the output capacitor 106 may be a DC link capacitor. The output capacitor 106 may include, for example, a dielectric capacitor, a film capacitor, a ceramic capacitor, an electrolytic capacitor, or the like. The output capacitor 106 may store a charge that may be used to power the load 104.

The transistor 110 may include, for example, an insulated-gate bipolar transistor (IGBT) or a metal-oxide-semiconductor field-effect transistor (MOSFET). In various embodiments, the transistor 110 may include the IGBT due to desirable properties of IGBTs. In various embodiments, transistor 110 may instead include a metal-oxide-semiconductor field-effect transistor (MOSFET), as will be described below with reference to FIG. 1B.

The transistor 110 may include a collector 112, an emitter 114, and a gate 116. The collector 112 of the transistor 110 may be coupled to the power source 102. The emitter 114 of the transistor 110 may be coupled to the load 104. The gate 116 of the transistor 110 may be coupled to the controller 122.

The collector resistor 118 may be electrically coupled between the collector 112 and the gate 116 of the transistor 110. The emitter capacitor 120 may be coupled between the gate 116 and the emitter 114 of the transistor 110. In that regard, current may flow from the power source 102 through the collector resistor 118 and the emitter capacitor 120 to charge the output capacitor 106.

The collector resistor 118 may include any resistor such as, for example, a thin film resistor, a carbon composition resistor, a wire wound resistor, or the like. In various embodiments, the collector resistor 118 may have a value between 1 Kilo ohm and 100 Mega ohms, between 10 Kilo ohms and 10 Mega ohms, or between 10 Kilo ohms and 1 Mega ohm.

The collector resistor 118 may reduce a circuit closed loop gain to make the system 100 less dependent upon open circuit transconductance.

The emitter capacitor 120 may include any capacitor such as, for example, a dielectric capacitor, a film capacitor, a ceramic capacitor, an electrolytic capacitor, or the like. In various embodiments, the emitter capacitor 120 may have any value greater than 0.01 microFarads (0.01 μF) such as between 0.01 μF and 1 F, between 0.1 μF and 100 mF, or between 0.1 μF and 1 mF.

By selecting the value of the collector resistor 118 and the value of the emitter capacitor 120, the collector current may be controlled by a time constant set by the RC values, the DC link capacitance, and the DC link voltage. Provided the design with a known DC link voltage and capacitance, the inrush current may be controlled by the passive components (i.e., the collector resistor 118 and the emitter capacitor 120).

It is desirable for the output capacitor 106 to be charged prior to the transistor 110 being turned on (i.e., prior to the transistor 110 transmitting a driving current from the power source 102 to the load 104). Furthermore, it is desirable to reduce inrush current between the power source 102 and the load 104. In that regard, prior to the transistor 110 turning on, current may flow from the power source 102 through the collector resistor 118 and the emitter capacitor 120 to the output capacitor 106 in order to charge the output capacitor 106. Based on the values of the collector resistor 118 and the emitter capacitor 120, the inrush current may be limited below a desirable level.

The controller 122 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 122 may further include any non-transitory memory known in the art. The memory may store instructions usable by the logic device perform operations, such as those illustrated in FIG. 2 herein.

The gate resistor 124 may be electrically coupled between the controller 122 and the gate 116 of the transistor 110. The gate resistor 124 may include any resistor such as, for example, a thin film resistor, a carbon composition resistor, a wire wound resistor, or the like. In various embodiments, the gate resistor 124 may have a value between 100 ohms and 1 Mega ohm, between 1 Kilo ohm and 1 Mega ohm, or between 10 Kilo ohms and 100 Kilo ohms.

The diode 126 may be electrically coupled between the emitter 114 and the collector 112 transistor 110. The diode 126 may include any diode such as a Schottky diode, a PN junction diode, or the like. The diode 126 may be biased in such a way as to prevent current flowing through the diode 126 from the collector 112 to the emitter 114.

The sensor 128 may include any sensor capable of detecting data corresponding to a charge level of the output capacitor 106. For example, the sensor 128 may include a voltage sensor coupled to a positive terminal of the output capacitor 106 and capable of detecting a voltage at the positive terminal. As another example, the sensor may include a current sensor capable of detecting current flowing through the emitter capacitor 120, the collector resistor 118, or another portion of the system 100. The charge level of the output capacitor 106 may be determined based on the current flowing through the corresponding portion of the system 100.

Figure 1B:
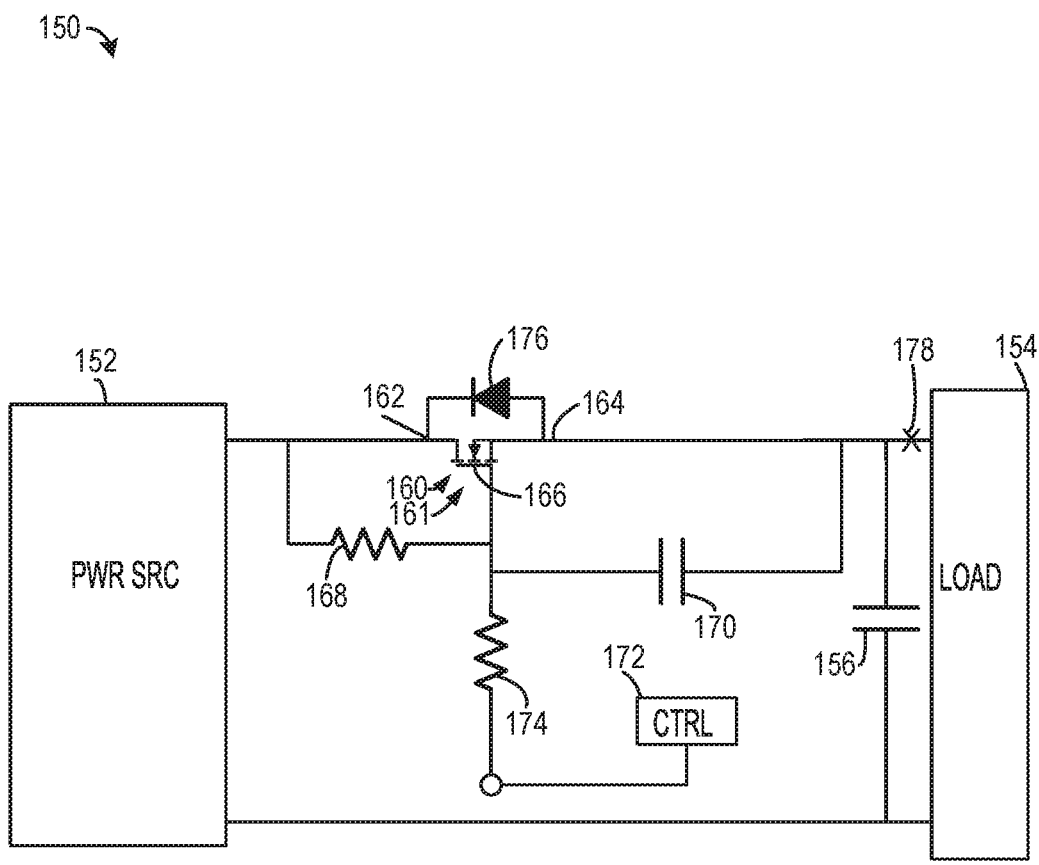
FIG. 1B is a schematic drawing illustrating a system for controlling inrush current between a power source and a load, in accordance with various embodiments of the present disclosure.

Referring now to FIG. 1B, another system 150 for controlling inrush current is shown. The system 150 may be designed to limit inrush current between a power source 152 and a load 154. The system 150 may include an output capacitor 156, a transistor 160 having a drain 162, a source 164, and a gate 166, a collector resistor 168, an emitter capacitor 170, a controller 172, a gate resistor 174, another diode 176, and a sensor 178. The components of the system 150 may function in a similar manner as the system 100 of FIG. 1 except that the transistor 160 is a MOSFET 161 (as opposed to the IGBT of the system 100). In that regard, the drain 162 functions as the collector 112 and the source 164 functions as the emitter 114.

Figure 2:
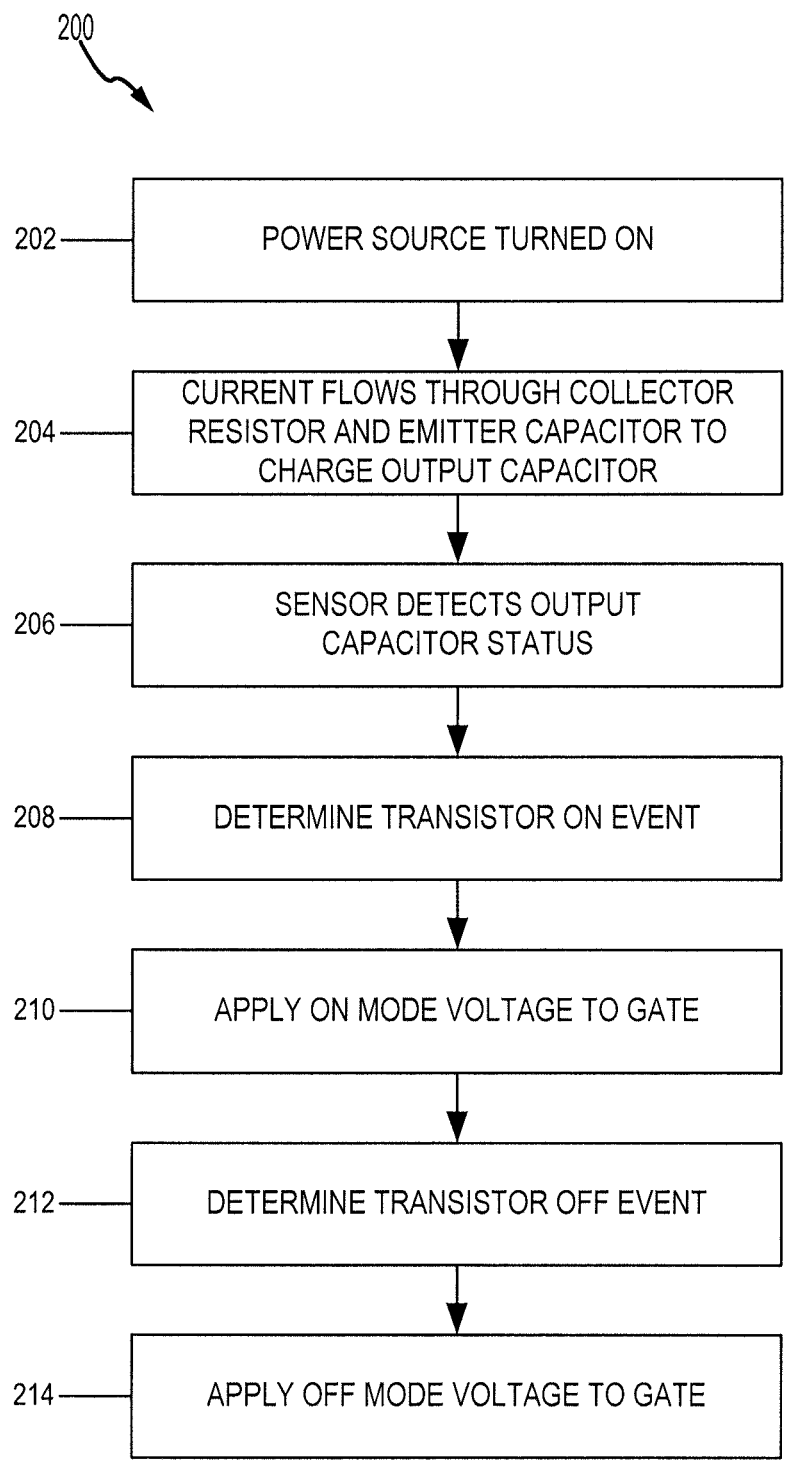
FIG. 2 illustrates a method for controlling inrush current between a power source and a load, in accordance with various embodiments of the present disclosure.
Figure 3A:
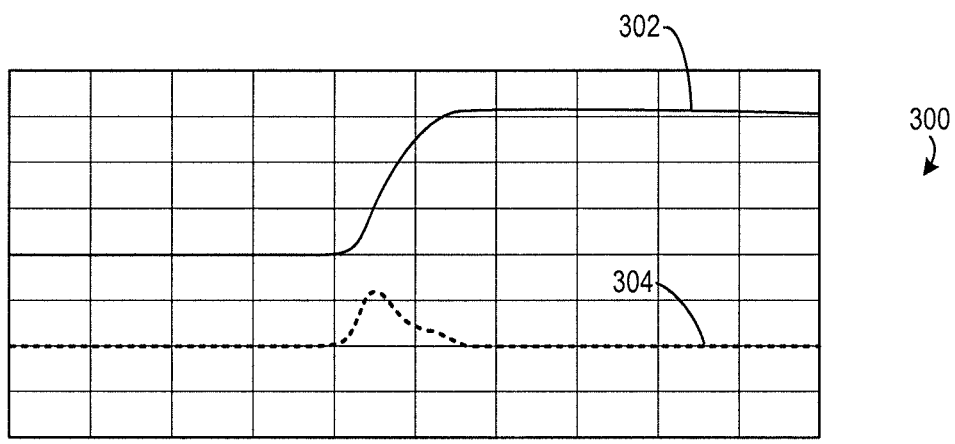
FIGS. 3A, 3B, and 3C illustrate results of experiments using the system of FIG. 1A, in accordance with various embodiments of the present disclosure.
Figure 3B:
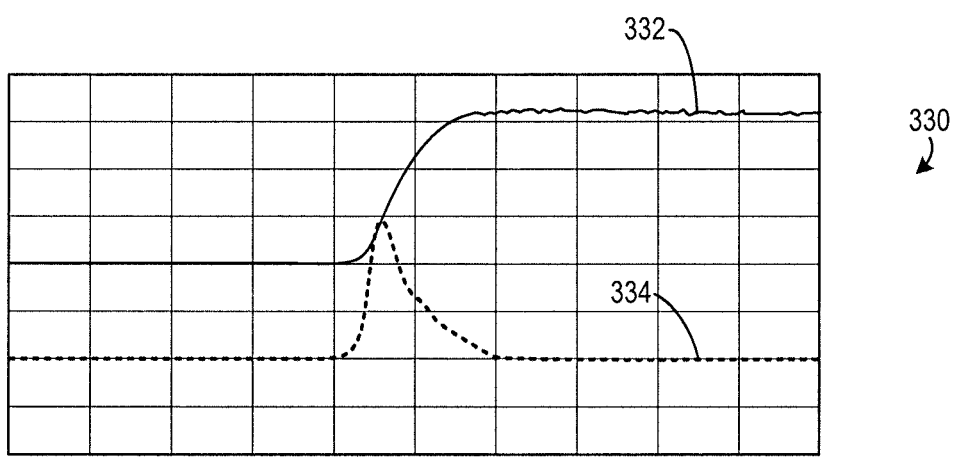
Figure 3C:
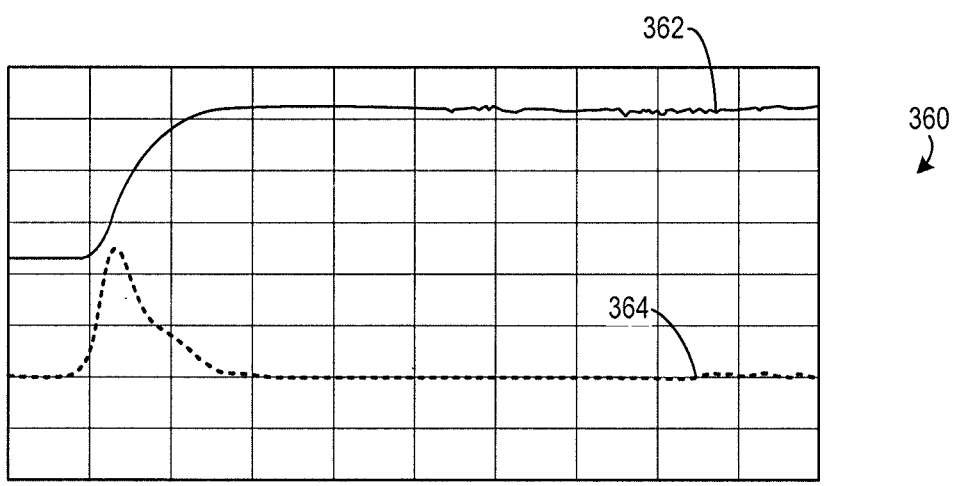

Turning to FIG. 2, a method 200 for controlling inrush current between a power source and a load is shown. The method 200 may be performed by a system such as the system 100 of FIG. 1A or the system 150 of FIG. 1B.

In block 202, a power source may be turned on. For example, an on/off button of the power source may be depressed, the power source may begin receiving power from a primary power source, or the like.

In block 204, current may flow through a collector resistor and an emitter capacitor in order to charge an output capacitor of the system.

In block 206, a sensor may detect an output capacitor status. The output capacitor status may correspond to a charge level of the output capacitor. For example, the output capacitor status may indicate that the output capacitor is partially charged, fully charged, or not charged at all.

In block 208, a controller may determine a transistor on event based on the output capacitor status. For example, if the output capacitor status indicates that the output capacitor is fully charged then the controller may determine or identify the transistor on event.

In block 210, a controller may apply an on mode voltage to a gate of the transistor. Applying the on mode voltage to the gate of the transistor may cause the transistor to operate in an on mode in order to allow a driving current to flow through the transistor in order to power the load.

In block 212, the controller may determine a transistor off event. For example, the controller may determine or identify the transistor off event in response to determining that the power source is no longer outputting power. In various embodiments, the controller may determine or identify that the power source is no longer outputting power based on data detected by the sensors.

In block 214, the controller may apply an off mode voltage to the gate of the transistor. Applying the off mode voltage to the gate of the transistor may cause the transistor to operate in an off mode. In response to operating in the off mode, the transistor prevents the driving current from flowing through the transistor to the load, thus reducing the likelihood of the driving current being received by the load. By causing the transistor to operate in the off mode, undesirable inrush current is unlikely to occur in response to the power source being turned back on.

Referring now to FIGS. 1A, 3A, 3B, and 3C, a set of graphs 300, 330, 360 illustrates results from lab tests using the system 100 of FIG. 1A. In particular, the 1st graph 300 illustrates gate voltage 302 and inrush current 304 in response to voltage at the gate 116 being held at 640 volts and the output capacitor 106 being set to 30 μF. The second graph 330 illustrates gate voltage 332 and inrush current 334 in response to voltage at the gate 116 being held at 640 volts and the output capacitor being set to 60 μF. The third graph 360 illustrates gate voltage 362 and inrush current 364 in response to a preexisting voltage of 640 volts at the gate 116 and the gate 116 turning from an off state to an on state. The results illustrated in the graphs 300, 330, 360 show that the inrush current is limited regardless of the order of applied conditions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling inrush current between a power source and a load, comprising:
   an output capacitor configured to be coupled in parallel with the load;
   a sensor configured to detect an output capacitor status corresponding to a charge level of the output capacitor;
   a transistor having a gate, a collector configured to be coupled to the power source, and an emitter configured to be coupled to the load;
   a collector resistor coupled between the collector of the transistor and the gate of the transistor; and
   an emitter capacitor coupled between the gate of the transistor and the emitter of the transistor to facilitate current flow from the power source through the collector resistor and the emitter capacitor to charge the output capacitor.

2. The system of claim 1, further comprising a diode coupled between the emitter of the transistor and the collector of the transistor.

3. The system of claim 2, wherein the diode is biased to reduce a likelihood of current flowing through the diode from the collector to the emitter.

4. The system of claim 1, further comprising a controller coupled to the gate of the transistor and the sensor and configured to control the transistor based on the output capacitor status.

5. The system of claim 4, wherein the controller is further configured to:
   determine a transistor on event in response to the output capacitor status indicating that the output capacitor is fully charged; and
   apply an on mode voltage to the gate of the transistor to cause the transistor to operate in an on mode to allow a driving current to pass through the transistor to power the load in response to determining the transistor on event.

6. The system of claim 5, wherein the controller is further configured to:
   determine a transistor off event in response to determining that the power source has been turned off; and
   apply an off mode voltage to the gate of the transistor to cause the transistor to prevent the driving current from passing through the transistor.

7. The system of claim 4, further comprising a gate resistor coupled between the controller and the gate of the transistor.

8. The system of claim 1, wherein the transistor is an insulated-gate bipolar transistor (IGBT).

9. A system for controlling inrush current between a power source and a load, comprising:
   an output capacitor configured to be coupled in parallel with the load;
   a transistor having a gate, a collector configured to be coupled to the power source, and an emitter configured to be coupled to the load;
   a collector resistor coupled between the collector of the transistor and the gate of the transistor;
   an emitter capacitor coupled between the gate of the transistor and the emitter of the transistor to facilitate current flow from the power source through the collector resistor and the emitter capacitor to charge the output capacitor; and
   a controller coupled to the gate of the transistor and configured to:
      determine a transistor on event in response to determining that the output capacitor is fully charged, and
      apply an on mode voltage to the gate of the transistor to cause the transistor to operate in an on mode to allow a driving current to pass through the transistor to power the load in response to determining the transistor on event.

10. The system of claim 9, further comprising a diode coupled between the emitter of the transistor and the collector of the transistor and biased to reduce a likelihood of current flowing through the diode from the collector to the emitter.

11. The system of claim 9, further comprising a sensor coupled to the controller and configured to detect an output capacitor status corresponding to a charge level of the output capacitor.

12. The system of claim 11, wherein the controller is further configured to determine the transistor on event in response to the output capacitor status indicating that the output capacitor is fully charged.

13. The system of claim 9, wherein the controller is further configured to:
    determine a transistor off event in response to determining that the power source has been turned off; and
    apply an off mode voltage to the gate of the transistor to cause the transistor to prevent the driving current from passing through the transistor.

14. The system of claim 9, wherein the transistor is an insulated-gate bipolar transistor (IGBT).

15. A method for controlling inrush current between a power source and a load, comprising:
    outputting, by the power source, electrical current;
    facilitating, by a collector resistor and an emitter capacitor of a circuit, flow of the electrical current through the collector resistor and the emitter capacitor to charge the output capacitor, the circuit being located between the power source and the load and having:
        an output capacitor configured to be coupled in parallel with the load,
        a transistor having a gate, a collector configured to be coupled to the power source, and an emitter configured to be coupled to the load,
        the collector resistor coupled between the collector of the transistor and the gate of the transistor, and
        the emitter capacitor coupled between the gate of the transistor and the emitter of the transistor;
    determining, by a controller, a transistor on event in response to the output capacitor being fully charged; and
    applying, by the controller, an on mode voltage to the gate of the transistor to cause the transistor to operate in an on mode to allow a driving current to pass through the transistor to power the load in response to determining the transistor on event.

16. The method of claim 15, further comprising detecting, by a sensor, an output capacitor status corresponding to a charge level of the output capacitor, wherein determining the transistor on event further includes determining the transistor on event in response to the output capacitor status indicating that the output capacitor is fully charged.

17. The method of claim 15, further comprising:
    determining, by the controller, a transistor off event in response to determining that the power source has been turned off; and
    applying, by the controller, an off mode voltage to the gate of the transistor to cause the transistor to prevent the driving current from passing through the transistor.

18. The method of claim 15, wherein
    the transistor is an insulated-gate bipolar transistor (IGBT).

19. A system for controlling inrush current between a power source and a load, comprising:
    an output capacitor configured to be coupled in parallel with the load;
    a sensor configured to detect an output capacitor status corresponding to a charge level of the output capacitor;
    a transistor having a gate, a drain configured to be coupled to the power source, and a source configured to be coupled to the load;
    a drain resistor coupled between the drain of the transistor and the gate of the transistor; and
    an source capacitor coupled between the gate of the transistor and the source of the transistor to facilitate current flow from the power source through the drain resistor and the source capacitor to charge the output capacitor.

20. A method for controlling inrush current between a power source and a load, comprising:
    outputting, by the power source, electrical current;
    facilitating, by a drain resistor and an source capacitor of a circuit, flow of the electrical current through the drain resistor and the source capacitor to charge the output capacitor, the circuit being located between the power source and the load and having:
        an output capacitor configured to be coupled in parallel with the load,
        a transistor having a gate, a drain configured to be coupled to the power source, and a source configured to be coupled to the load,
        the drain resistor coupled between the drain of the transistor and the gate of the transistor, and
        the source capacitor coupled between the gate of the transistor and the source of the transistor;
    determining, by a controller, a transistor on event in response to the output capacitor being fully charged; and
    applying, by the controller, an on mode voltage to the gate of the transistor to cause the transistor to operate in an on mode to allow a driving current to pass through the transistor to power the load in response to determining the transistor on event.

* * * * *